UNITED STATES PATENT OFFICE.

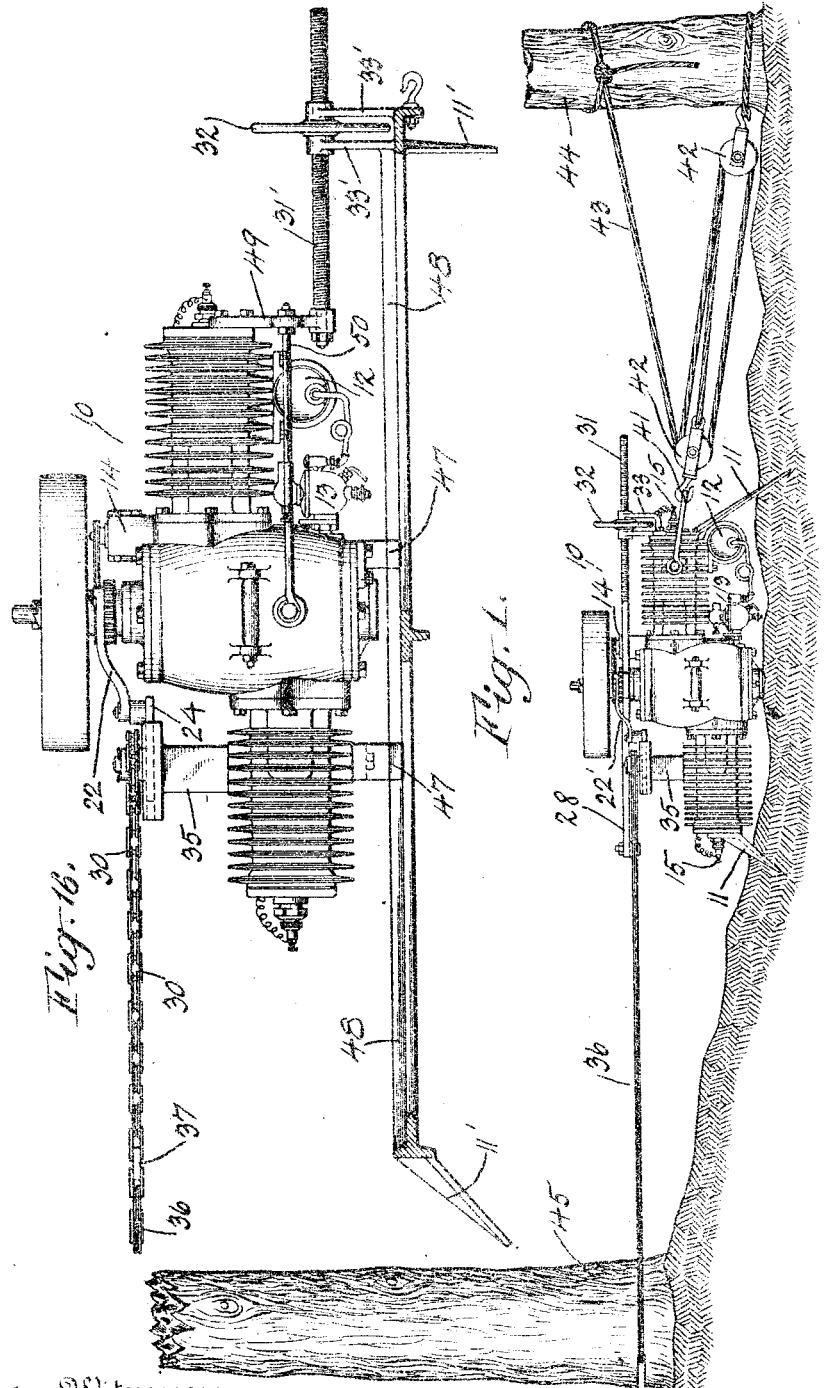

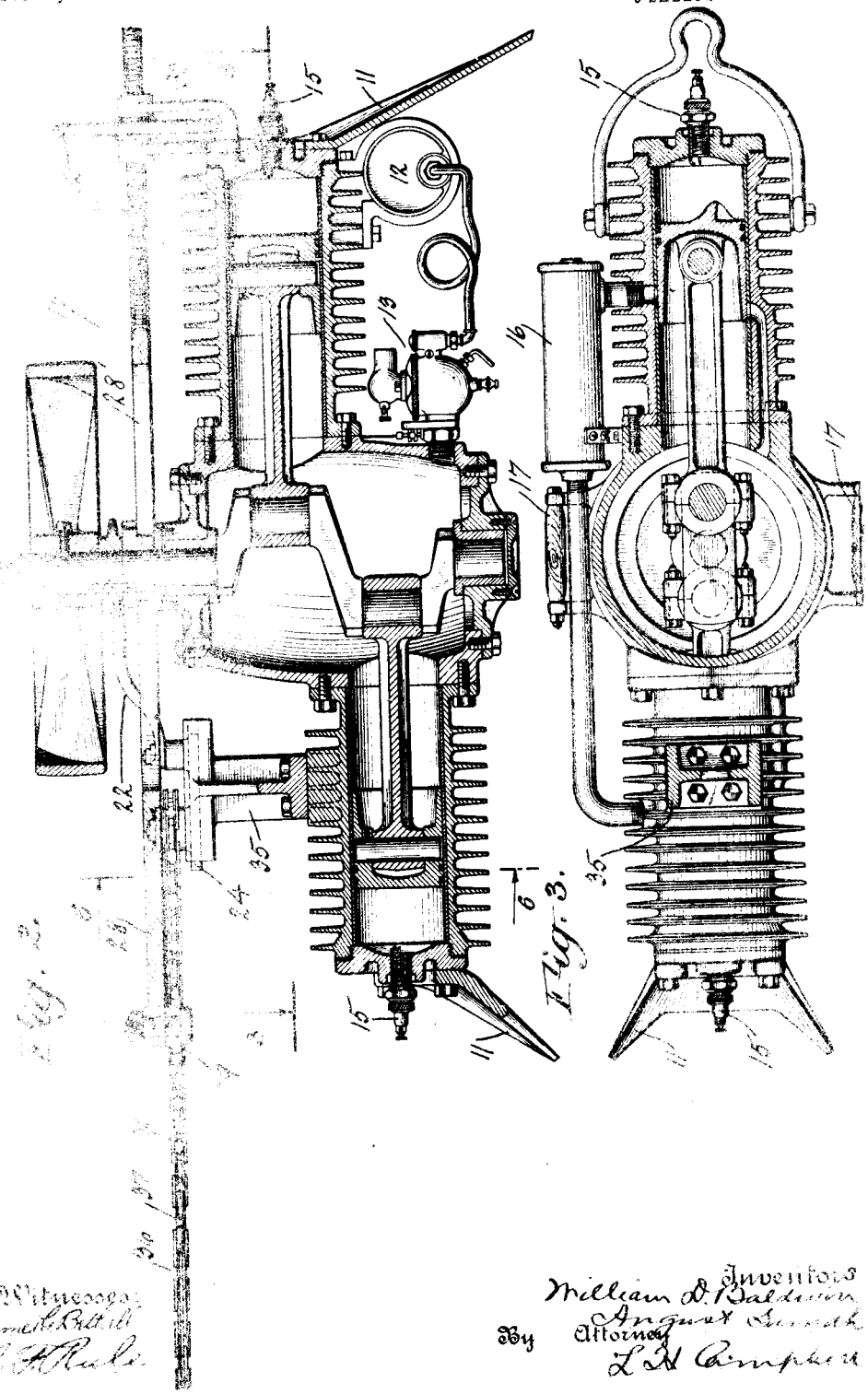

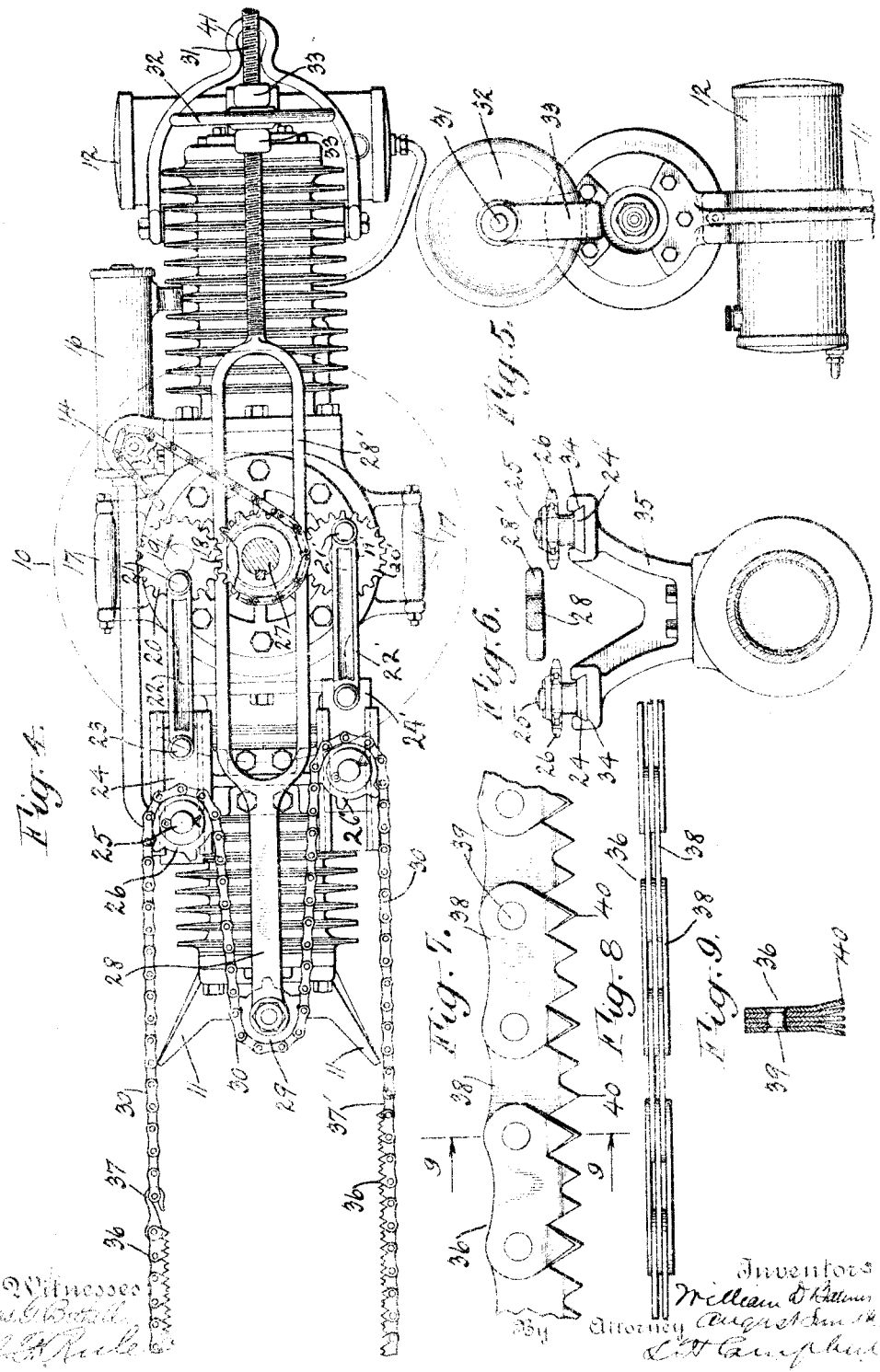

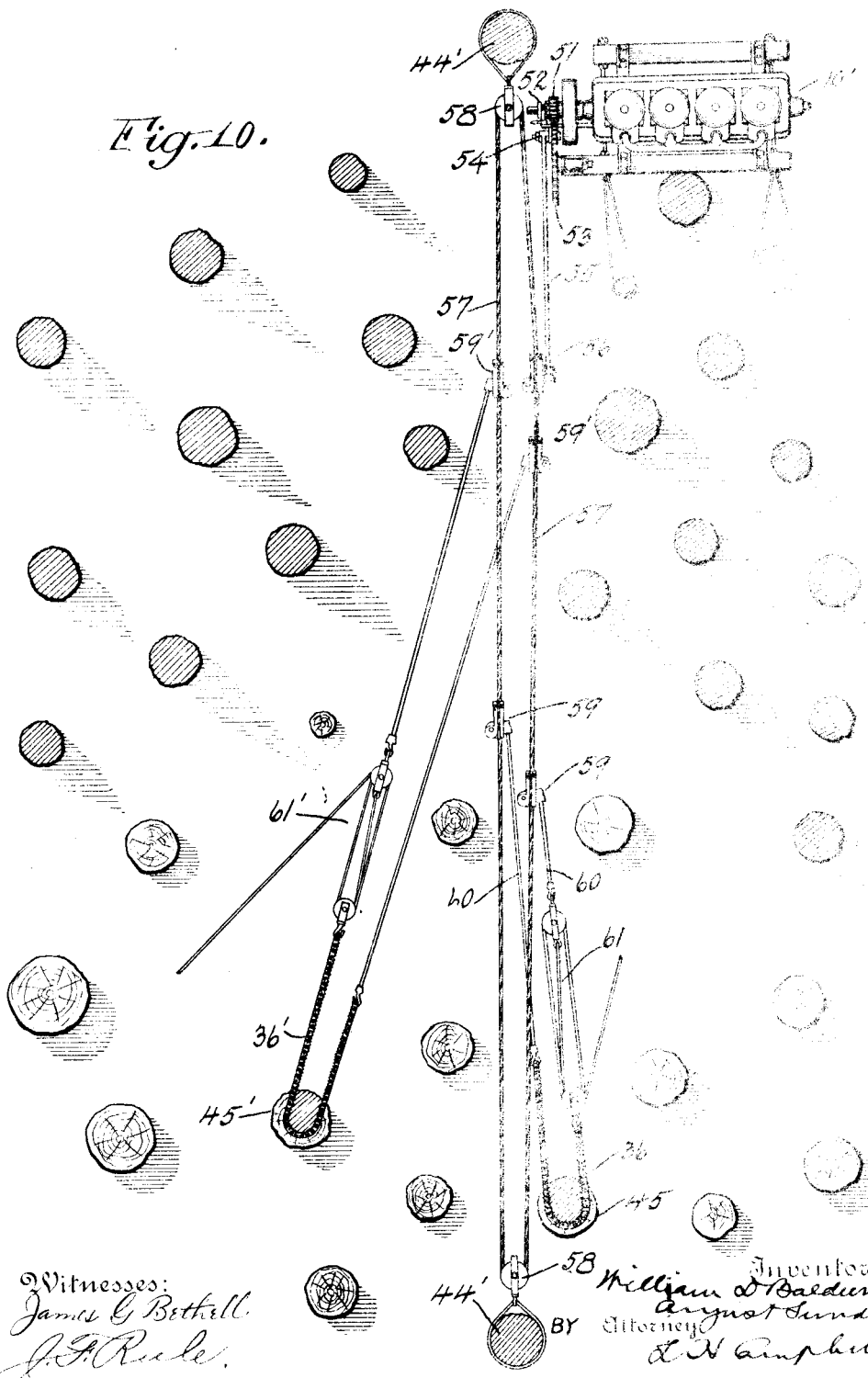

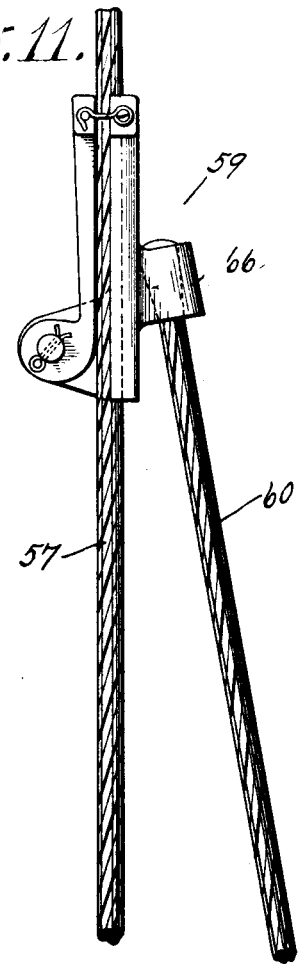
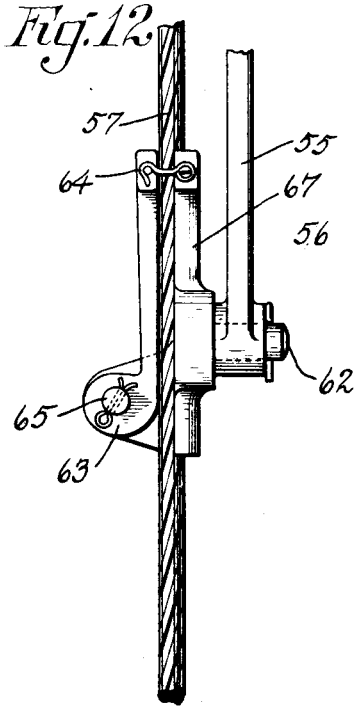
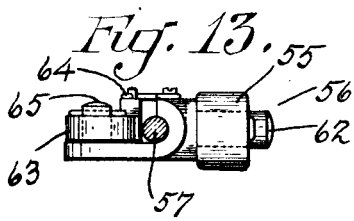
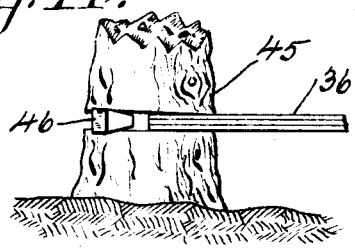
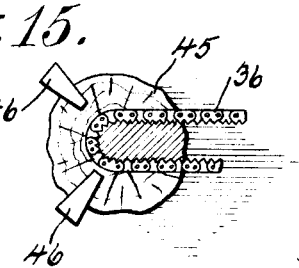

WILLIAM D. BALDWIN, OF NEW YORK, AND AUGUST SUNDH, OF YONKERS, NEW YORK.

TREE-CUTTING DEVICE.

1,127,347.  Specification of Letters Patent.  Patented Feb. 2, 1915.

Application filed December 2, 1909. Serial No. 531,063.

*To all whom it may concern:*

Be it known that we, WILLIAM D. BALDWIN and AUGUST SUNDH, citizens of the United States, residing in New York, county and State of New York, and Yonkers, in the county of Westchester and State of New York, have invented a new and useful Improvement in Tree-Cutting Devices, of which the following is a specification.

Our invention relates to improvements in tree-cutting devices and has for one of its objects the provision of power driven mechanism for cutting logs or trees, which is self-contained and of comparatively light weight so as to be easily transported from place to place and which is capable of cutting a number of trees without altering the position of the driving mechanism.

Another object of our invention is the provision of practical and efficient means for cutting large or small trees close to the ground regardless of the condition of the surrounding land, and so arranged that a number of trees may simultaneously be cut.

A further object is the provision of a tree cutting device in which the operating mechanism may be located at a considerable distance from the tree or other object to be cut, thereby making it possible to operate on objects which would otherwise be inaccessible.

Other objects will appear hereinafter, the novel combinations of elements being pointed out in the appended claims.

In the accompanying drawings, Figure 1 represents in side elevation, a practical embodiment of our invention; Fig. 2 is an enlarged sectional side view of the engine and saw-operating mechanism shown in Fig. 1; Fig. 3 is a sectional plan view of Fig. 2 upon the line 3—3; Fig. 4 is a plan view of Fig. 2; Fig. 5 is an end view of Fig. 2; Fig. 6 is a sectional end view of Fig. 2 upon the line 6—6; Figs. 7 and 8 are plan and side views respectively, of a chain saw; Fig. 9 is a sectional view of Fig. 7 upon the line 9—9; Fig. 10 is a plan view of a modification of our invention; Figs. 11, 12 and 13 are detail views of certain parts of the apparatus shown in Fig. 10; Figs. 15 and 14 represent in plan and side views respectively, a method for preventing the saw from binding as the same cuts its way into the tree; Fig. 16 is a view similar to Fig. 2 showing a modification.

Similar reference characters denote corresponding parts throughout all the figures.

Numerous devices have been proposed for cutting trees, stumps, etc., by power driven saw mechanism and it has been found in general that such devices have met with indifferent success, and, owing to their many disadvantageous features, their use has been very limited and very unsatisfactory except under the most favorable conditions. In nearly every instance a heavy, steam-traction engine is used to operate a drag, or reciprocating saw through suitable transmission mechanism, and, owing to the ponderous weight of such apparatus, it is impossible to use it where the ground is hilly or swampy, or where the trees grow closely together as in a forest.

Broadly speaking, our invention comprises a chain saw which may easily be swung about a tree or stump and which is given a reciprocating motion by means of an internal combustion engine of light weight and suitable intermediate mechanism.

Referring to the drawings, 10 designates an internal combustion or gasolene engine of the two-cycle, two cylinder, opposed type arranged for air cooling. An engine of this description is particularly adapted for our purpose in that it combines the features of light weight, compactness, maximum power for a given weight and freedom from vibration. The engine is preferably arranged so that its crank shaft is in a vertical direction with the balance, or fly-wheel uppermost as shown in Figs. 1 and 2. Bolted to the head of each cylinder is a foot 11 which may be thrust into the ground when the engine is set up into operating position, these feet being for the purpose of securely holding the engine against bodily movement when the same is in operation.

12 designates a fuel tank which is secured to the engine at a suitable place and which is connected by piping to a carbureter or vaporizer 13 communicating with the crank case of the engine. The ignition apparatus comprises an electric generator 14 which may be connected through suitable coil and circuit closing mechanism to the high tension spark plugs 15—15 at the end of each cylinder.

16 designates the usual muffler which is connected to the exhaust ports of each cylinder and which serves to diminish the noise of the engine exhaust. Handles, designated by 17—17, are secured to opposite sides of the crank case of the engine, by means of which the latter may be readily transported from place to place.

An engine constructed in the manner set forth is entirely self-contained in that it does not require additional storage tanks for fuel or water, and at the same time will have ample power and may easily be carried from place to place by two men and located in positions which would be inaccessible for heavy, cumbersome engines such as steam or electric motors.

While the above description applies to a prime mover of desirable construction, such construction is not essential.

Referring more particularly to Fig. 4, 18 designates a spur gear which is keyed or otherwise secured to the crank shaft 27. In mesh with this gear are two gears 20 and 20' of equal size which are pivoted at 19 and 19' respectively, to the engine casing. Both of the gears 20, 20' are provided with crank pins 21, 21' located at equi-distant points from their pivots 19, 19' respectively, and these crank pins are connected by the pitmans 22, 22' to reciprocating blocks 24, 24' respectively. The latter are dovetailed on both sides and are adapted to move in corresponding dovetailed grooves or channels 34 formed in the diverging ends of a bracket 35 secured to the engine cylinder (see Fig. 6). Each of the reciprocating blocks 24, 24', carries a shouldered stud such as 25, and upon each of these studs is loosely mounted a sprocket wheel 26. It will be seen from Fig. 4 that the crank pins 21 and 21' are set 180 degrees apart so that, as the driving gear 18 rotates, the reciprocating blocks will move in opposite directions with respect to each other. 28 designates a tension or saw-feeding bar which carries upon one end a sprocket wheel 29 securely fixed against movement and arranged in the same plane as the reciprocating sprockets 26 and 26'. The middle portion, 28', of the tension bar 28, is yoke-shaped and straddles a base on the driving gear 18, the latter acting as a guide therefor. The other end 31 of the tension bar is screw threaded throughout and is supported by a double arm bracket 33, 33 through which it loosely passes. A hand wheel 32 is threaded upon this end of the tension bar and is located between the arms of the double arm bracket 33. 30 designates a sprocket chain which leads over the sprocket wheels 26, 29 and 26' after the manner illustrated in Fig. 4. One end of this sprocket chain is connected to a chain saw 36 by means of a detachable link 37' or other suitable fastening.

The operation of the saw driving mechanism is as follows: As the driving gear 18 is rotated by the crank shaft 27 of the engine, the gears 20 and 20' are driven, thereby causing the reciprocating blocks 24 and 24' to move back and forth in opposite directions by means of the pitmans 22 and 22' respectively. Since the block 24, together with the sprocket wheel 26 connected thereto, is in its extreme left hand position as shown in Fig. 4, a rotation of the gear 20 in either direction will cause the block 24 to move in a right hand direction, its extent of movement being determined by the distance at which the crank pin 21 is located with respect to the center of the gear 20. Since the sprocket wheel 29 is fixed against rotary movement it is readily seen that the movement of the reciprocating block 24 in a right hand direction will cause the upper part of the sprocket chain 30 to move in the same direction, and since the sprocket wheel 26 lies in a bight in the chain, the saw 36 connected thereto will move through a distance just double that of the reciprocating block 24. While one end of the sprocket chain 30 is moving through a certain distance, the opposite end is moving through the same distance only in a reverse direction, thus, as one end of the chain is taken up the other end is paid out thereby giving the saw 36 the desired reciprocating movement. In order that the proper tension may be given the saw so that it will feed correctly the sprocket wheel 29 is bodily moved by rotating the hand wheel 32 in the proper direction. In this manner the tension or saw-feeding bar 28 may be moved so as to slacken the saw or to place it under any desired tension.

The saw, *per se*, is clearly illustrated in Figs. 7, 8, and 9 and comprises a series of links such as 38 which are preferably arranged after the manner of a sprocket chain. Each link is made of tempered steel which is notched on one edge so as to form saw teeth and these teeth are set or bent outwardly as shown in Fig. 9 so that the saw may have proper clearance. The separate links may be grouped in various ways so as to produce a saw of any desired thickness and length, and the links are secured together by means of countersunk rivets so that the lateral faces of the complete saw will be devoid of all projections, which would tend to interfere with its proper operation when at work.

The method of sawing a tree or stump close to the ground is shown in Fig. 1. The engine 10 is first located at a suitable point in the vicinity of the tree and the feet 11, 11 firmly pressed into the ground. The saw 36 is then led about the tree at a point where the cut is to be made and brought back to the sprocket chain of the saw operating mechanism to which it is secured by the hook 37 (Figs. 2 and 4). The engine is then started and the saw rapidly cuts its way through the tree, being advanced or fed into the cut by the hand wheel 32. In order to guard against the engine being displaced from its position by reaction of the saw when in operation, a bail 41 is secured to the engine by means of which the latter may be secured to a neighboring tree 44 or other suitable stationary object by the use of a block and fall comprising the blocks 42, 42 and rope 43. In order to prevent the saw from binding as it advances into the tree, wedges such as 46, 46 (Figs. 14 and 15) may be driven into place after the saw has started its cut so that the tree will be supported upright and cannot lean over so as to bind the saw in the cut after the tree has been nearly cut through. The saw may be unhooked and removed from the cut and then by knocking out the wedges the tree will in most cases fall away from the engine.

The modification illustrated in Fig. 16 shows a means for feeding the saw wherein the engine and saw operating mechanism may be moved bodily. The engine 10 is provided with grooved lugs 47, 47 which rest upon a frame 48 of T-rail construction. A bracket 49 is secured to the cylinderhead of the engine and also to the crank case of the engine by means of one or more stay rods 50. This bracket carries a long screw threaded rod 31' which is guided by the two-arm bracket 33' formed integral with or secured to, the frame 48. A hand wheel 32 is threaded upon the rod 31' by means of which the engine may be moved back and forth upon the T-rails to regulate the feed of the saw. This construction dispenses with the tension bar 28 shown in Figs. 2 and 4, also the sprocket wheel 29, that portion of the chain 30 which was formerly engaged by the sprocket wheel 29 being secured against movement by any suitable fastening means.

Fig. 10 shows a somewhat different arrangement whereby the apparatus is adapted to operate upon a number of trees simultaneously. 10' designates a multiple-cylinder gasolene engine of the vertical type which is arranged to drive a gear 51 through a clutch 52. The gear 51 meshes with a gear 53 provided with a crank pin 54 to which is connected a driving rod 55 and cable clamp 56. The latter is connected to an endless cable 57 which runs through a pair of stationary pulley blocks 58, 58 secured to trees 44', 44' somewhat removed from each other. Adjustable clamps 59, 59 are secured to opposite leads of the cable 57 which are connected by other cables 60, 60 to the ends of the chain saw 36. A block and fall tension device 61 is interposed between one of the cables 60 and the chain saw, by means of which the tension on the saw may be regulated and the same fed into the cut. Other clamps 59', 59' are in like manner secured to the cable 57 and these clamps are connected to an additional saw 36' provided with a tension device 61'. In like manner other saws may be operatively connected to the cable 57 so that any desired number of trees may simultaneously be cut without altering the position of the cable 57 or the driving engine 10'.

Fig. 12 shows in detail one of the adjustable clamps 56. It comprises a body portion 67 grooved to receive the cable 57 which is prevented from slipping therein by an eccentric lever 63 pivoted at 65. The lever may be moved about its pivot in order to permit the clamp to be applied to the cable 57 after which it is tightened upon the cable and held in tightened position by means of a hook 64. The connecting rod 55 is secured to the clamp 56 by means of the pin 62. The clamp 59 is constructed similar to the clamp 56 just described excepting that it is provided with a lug 66 instead of the crank pin 62 by means of which a cable 60 may be secured thereto.

The operation of the apparatus illustrated in Fig. 10 is as follows: The engine 10' is first set up in proper position and secured in place as is also the cable 57 and pulley blocks 58, 58. The saws 36 and 36' are now brought to bear upon the trees which it is desired to cut down and the same are connected by the clamps 59 and 59' respectively to the cable 57. The engine is now set in motion after which the clutch 52 is thrown into gear so that the rotary motion of the engine is transmitted through the gears 51 and 53 to the connecting rod 55. As the latter moves back and forth, the cable 57 is given a reciprocating motion which motion is transmitted to the saws 36 and 36'. By manipulating the take up devices 61 and 61' the corresponding saws may be properly fed to their work and the saws will in time cut through the trees which they are operating upon. By means of this apparatus any desired number of saws may be at work simultaneously, and a large number of trees may be sawed without shifting the driving cable 57 or the motive power 10'.

The construction of the various elements or parts herein set forth to disclose our invention may be changed in various ways. It is therefore intended that the appended claims not only cover the different ways suggested herein of embodying our invention, but also the many modifications thereof which may be made.

Having described our invention, what we claim as new, and desire to secure by Letters Patent of the United States is:—

1. In a sawing apparatus, the combination of a chain saw, a sprocket chain connected to said saw, a pair of sprocket wheels associated with said sprocket chain, said chain being held against movement at a point intermediate the sprocket wheels and power driven means for reciprocating said sprocket wheels, substantially as described.

2. In a sawing apparatus, the combination of a chain saw, a sprocket chain connected to said saw, a pair of sprocket wheels associated with said sprocket chain, an additional sprocket wheel lying in a bight in said sprocket chain and fixed against rotary movement, power driven mechanism for reciprocating said pair of sprocket wheels, and means for effecting a bodily movement of said additional sprocket wheel for the purpose of varying the tension of said sprocket chain and saw.

3. In a sawing machine, the combination of a chain saw, a sprocket chain connected thereto, a motor, reciprocating mechanism operatively connected with said motor and said sprocket chain, means for holding the sprocket chain stationary at one point in its length, and means for varying the position of said holding means, substantially as described.

4. In a sawing machine, the combination of a chain saw, a sprocket chain connected thereto, a motor, reciprocating mechanism operatively connected to said motor and sprocket chain, a tension bar in fixed engagement with said sprocket chain, and means for effecting a movement of said tension bar to vary the tension of said saw, substantially as described.

5. In a sawing machine, the combination of a chain saw, a sprocket chain connected thereto, means to hold part of said chain in a fixed position, a motor, reciprocating members operatively connecting said motor and sprocket chain, to effect a reciprocating movement of the saw and means for varying the tension in said sprocket chain, substantially as described.

6. In a sawing apparatus, the combination of a motor, a pair of gears driven thereby, pitmans connecting each of said gears to a corresponding reciprocating block, a sprocket wheel secured to each of said blocks, an adjustable tension bar, a member located between the sprocket wheels and secured against movement to said tension bar, a sprocket chain associated with said sprocket wheels and member, and a chain saw connected to said sprocket chain, substantially as described.

7. In a sawing machine, the combination of an engine, a pair of gears driven by said engine, a pair of sliding blocks, pitman connections between each gear and a corresponding block, a sprocket wheel carried by each block, a chain saw, a sprocket chain connected to each end of the said saw, and arranged to be reciprocated by the said sprocket wheels, and means associated with said sprocket chain at a point intermediate the sprocket wheels for holding the chain in fixed position and for varying the tension on the said saw.

In testimony whereof, I have signed my name to this specification in the presence of two subscribing witnesses.

WM. D. BALDWIN

Witnesses:
 THOS. M. LOGAN,
 W. R. WHITE, Jr.

In testimony whereof, I have signed my name to this specification in the presence of two subscribing witnesses.

AUGUST SUNDH.

Witnesses:
 W. H. BRADY,
 E. L. ANSTELLI.